United States Patent
Banerjee (10) Patent No.: US 10,189,197 B2
(45) Date of Patent: Jan. 29, 2019

(54) SOFT AND VELVET TOUCH BARRIER LAMINATE

(71) Applicant: ESSEL PROPACK LIMITED, Mumbai (IN)

(72) Inventor: Mrinal Kanti Banerjee, Mumbai (IN)

(73) Assignee: ESSEL PROPACK LIMITED, Mumbai (IN)

( * ) Notice: Subject to any disclaimer, the term of this patent is extended or adjusted under 35 U.S.C. 154(b) by 0 days.

(21) Appl. No.: 15/325,285

(22) PCT Filed: May 27, 2016

(86) PCT No.: PCT/IN2016/050160
§ 371 (c)(1),
(2) Date: Jan. 10, 2017

(87) PCT Pub. No.: WO2016/194002
PCT Pub. Date: Dec. 8, 2016

(65) Prior Publication Data
US 2018/0079124 A1    Mar. 22, 2018

(30) Foreign Application Priority Data

May 29, 2015  (IN) .......................... 2099/MUM/2015

(51) Int. Cl.
*B29C 47/06*    (2006.01)
*B32B 27/36*    (2006.01)
(Continued)

(52) U.S. Cl.
CPC .............. *B29C 47/065* (2013.01); *B32B 1/08* (2013.01); *B32B 7/12* (2013.01); *B32B 15/085* (2013.01); *B32B 15/20* (2013.01); *B32B 27/06* (2013.01); *B32B 27/08* (2013.01); *B32B 27/18* (2013.01); *B32B 27/20* (2013.01); *B32B 27/306* (2013.01); *B32B 27/308* (2013.01); *B32B 27/32* (2013.01); *B32B 27/327* (2013.01); *B32B 27/34* (2013.01); *B32B 27/36* (2013.01); *B29C 53/36* (2013.01);
(Continued)

(58) Field of Classification Search
None
See application file for complete search history.

(56) References Cited

U.S. PATENT DOCUMENTS

| 6,872,438 B1 | 3/2005 | Allgeuer et al. |
| 2008/0233375 A1 | 9/2008 | Wright et al. |

(Continued)

FOREIGN PATENT DOCUMENTS

WO    2016079368 A1    5/2016

OTHER PUBLICATIONS

European Patent Office, International Search Report and Written Opinion issued in corresponding Application No. PCT/IN2016/050160, dated Sep. 14, 2016.

*Primary Examiner* — Catherine S Branch
(74) *Attorney, Agent, or Firm* — Stites & Harbison, PLLC; Mandy Wilson Decker (57) ABSTRACT

The present disclosure describes soft and velvet touch barrier laminate with customized polymer alloying which is dry or wet blending of multiple polymers, additives and colorant and making a single compounded polymer mix with designated characteristics. The soft and velvet touch barrier laminate can be used to prepare articles having soft outer surface with a mat finish.

26 Claims, 1 Drawing Sheet

(51) Int. Cl.
  *B32B 15/085*  (2006.01)
  *B32B 1/08*  (2006.01)
  *B32B 15/20*  (2006.01)
  *B32B 27/08*  (2006.01)
  *B32B 27/20*  (2006.01)
  *B32B 27/32*  (2006.01)
  *B32B 27/30*  (2006.01)
  *B32B 7/12*  (2006.01)
  *B32B 27/34*  (2006.01)
  *B32B 27/06*  (2006.01)
  *B32B 27/18*  (2006.01)
  *B29C 53/36*  (2006.01)

(52) U.S. Cl.
  CPC ..... *B32B 2250/05* (2013.01); *B32B 2264/102* (2013.01); *B32B 2264/104* (2013.01); *B32B 2264/108* (2013.01); *B32B 2264/12* (2013.01); *B32B 2270/00* (2013.01); *B32B 2274/00* (2013.01); *B32B 2307/408* (2013.01); *B32B 2307/4026* (2013.01); *B32B 2307/41* (2013.01); *B32B 2307/54* (2013.01); *B32B 2307/546* (2013.01); *B32B 2307/5825* (2013.01); *B32B 2307/702* (2013.01); *B32B 2307/72* (2013.01); *B32B 2307/7244* (2013.01); *B32B 2307/732* (2013.01); *B32B 2307/746* (2013.01); *B32B 2307/75* (2013.01); *B32B 2439/00* (2013.01); *B32B 2439/70* (2013.01); *B32B 2451/00* (2013.01)

(56) References Cited

U.S. PATENT DOCUMENTS

| 2013/0011669 | A1* | 1/2013 | Lu | B32B 27/32 |
| | | | | 428/349 |
| 2014/0076928 | A1* | 3/2014 | Banerjee | B32B 1/08 |
| | | | | 428/36.6 |
| 2014/0134430 | A1 | 5/2014 | Mitchell et al. | |

* cited by examiner

SOFT AND VELVET TOUCH BARRIER LAMINATE

TECHNICAL FIELD

The subject matter described herein in general relates to barrier laminates having soft outer surface with a mat finish, articles made therefrom, and the process of making the same.

BACKGROUND

The use of barrier laminates for packaging is well known in the industry. The "barrier" layer in barrier laminates serve to protect the packaged product from physical stresses caused by the normal handling of the product during packaging, shipping, or during commercialization. In addition, a heat sealant layer may be utilized to bond films together to form packages for products, such as pharmaceutical or food products. Further, the combination of layers may allow for a film that has favorable physical properties, such as, for example, strength, stiffness, abrasion and chemical resistance.

There are limited examples of barrier laminates with soft touch and mat finish. UV curing over varnish is one method of preparing barrier laminates with soft touch and mat finish. Hot air curing over water based lacquer can also be used to achieve soft and mat finish on articles, such as plastic tube container. Another way to achieve soft touch and mat finish on barrier laminates is by casting the outer film layer on a mat finished chill roll to generate mat outer surface. However, as the outer surface is passed through hot air zones or sealed with heat sealing jaws, the mat surface appearance gets diminished.

Thus there is a need of a barrier laminate with a sensory element such as soft touch and feel, mat and velvety look

SUMMARY

The present disclosure relates to a soft and velvet touch barrier laminate including: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

Further aspect of the present disclosure is the process for the preparation of the soft and velvet touch barrier laminate.

Another aspect of the present disclosure is an article comprising the barrier laminate in accordance with the present disclosure. Yet another aspect of the present disclosure is a process of preparing an article comprising the barrier laminate.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The detailed description is described with reference to the accompanying figures. In the figures, the left-most digit(s) of a reference number identifies the FIGURE in which the reference number first appears. The same numbers are used throughout the drawings to reference like features and components.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "co-extrusion" refers to a process of extruding multiple thermoplastic polymeric materials having affinity to bond with each other through different extruders, minimum of 2 but up to 11, and channelizing through a multi-manifold DIE to get a single composite film of desired thickness. Co-extrusion process could be either blown (air pressurized) or cast (on chill roll).

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 60° C. to about 90° C. should be interpreted to include not only the explicitly recited limits of about 60° C. to about 90° C., but also to include sub-ranges, such as 65° C. to 75° C., 80° C. to 90° C., and so forth, as well as individual amounts, including fractional amounts, within the specified ranges, such as 82.2° C., 85.6° C., and 71.3° C., for example.

The present disclosure relates to a soft and velvet touch barrier laminate including: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C. The outer surface or the printable layer of the barrier laminate soft and mat finish, good for print decoration. Inner surface of the laminate is smooth for easy heat sealability.

The soft and velvet touch barrier laminate can be used to form articles, such as tubular packaging materials that will safely hold semi liquid products such as paste for designated shelf life.

The conventional multilayer barrier sheets do not meet the requirement of high speed print process, innovative decoration and tubing conversion due to high coefficient friction, inconsistence mat finish vales, consistence print decoration. Moreover, the texture of artificially crafted laminate gets faded away with the processing of the multilayer laminate in secondary operations like printing & decoration, tubing, and open end sealing.

The present disclosure provides for soft and velvet touch barrier laminate with customized polymer alloying which is dry or wet blending of multiple polymers, additives and colorant and making a single compounded polymer mix with designated characteristics. The soft and velvet touch barrier laminate includes a printable layer comprising of polypropylene elastomer which is semicrystalline polyolefin copolymer due to the placement of propylene within the polymer chain in a stereoregular isotactic manner leading to isotactic propylene crystallinity. Along with polypropylene elastomer in the printable layer, stiffer high density polyethylene (HDPE) polymer can be used to provide a base for accepting softer polypropylene co-polymer. Replacement of HDPE with linear low density polyethylene (LLDPE) or blend of HDPE with LLDPE, can result in a laminate with undesirable properties, such as Shore hardness-D, in the range of 65 to 80 and roughness value (Ra) in the range of 0.3 to 0.5 micrometer. Film formulation require minimum of two layers extrusion but preferable 3 extruders-3 layers co-extrusion technique provide versatile product outcome.

Figure 1:
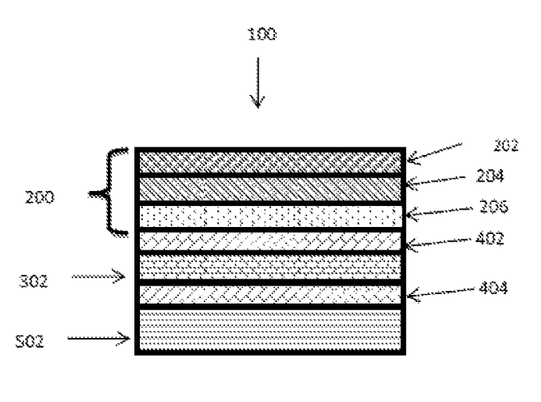
FIG. 1 illustrates a soft and velvet touch barrier laminate 100, according to an implementation of the present disclosure.

In one implementation of the present disclosure, FIG. 1 illustrates an exemplary structure of the soft and velvet touch barrier laminate 100, in accordance with an implementation of the present disclosure. In said implementation, as mentioned earlier, the soft and velvet touch barrier laminate 100 is formed having a minimum of seven-layered structure. The barrier layer 302 is selected from the group consisting of metal foil barrier film and non-metal multilayer barrier film. The barrier layer 302 is placed between first bond layer 402 and second bond layer 404. The surface film 200 includes at least three layers wherein layer 202 is a printable layer comprising of polypropylene elastomer, layer 204 is a core layer, and layer 206 is the laminating layer adjacent to the core layer. The inner polyethylene (PE) layer 502 is adjacent to the second bond layer 404. Due to the presence of the barrier layer 302, in the laminate 100, the laminate exhibits excellent barrier and product keeping properties throughout the designated shelf life.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C. The outer surface or the printable layer of the barrier laminate soft and mat finish, good for print decoration. Inner surface of the laminate is smooth for easy heat sealability.

In another implementation, the soft and velvet touch barrier laminate includes: (a) a printable layer comprising of polypropylene elastomer, high density polyethylene (HDPE), an anti-block additive; and a colorant, wherein the printable layer comprises of polypropylene elastomer, high density polyethylene (HDPE), anti-block additive and the colorant in a blend ratio in the range of 26:70:2:2 to 60:25:5:10; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C. The aforementioned ratio range provides for laminates with balanced mechanical properties, granular texture and easy process ability due to machine direction forward movement.

In yet another implementation, the soft and velvet touch barrier laminate includes: (a) a printable layer comprising of polypropylene elastomer, high density polyethylene (HDPE), an anti-block additive; and a colorant, wherein the printable layer comprises of polypropylene elastomer, high density polyethylene (HDPE), anti-block additive and the colorant in a blend ratio of 45:45:5:5; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

The surface film 200 includes at least three layers wherein the top layer is a printable layer comprising of polypropylene elastomer 202. A printable layer essentially consisting of soft polymer mono-material in single layer will not have easy forwarding movement on the machine direction. Hence, it is essential to have a stiffer supporting layer or core layer such as HDPE enriched blended polymer. For the laminating layer, i.e., the layer adjacent to core layer, it is essential to maintain linear enriched polymer combination to facilitate stronger bond with subsequent extrusion lamination layers. Colorant can be added in to the outer skin and core polymer layers according to the required color shade.

In one implementation, the polypropylene elastomer has semi crystallinity having vicat softening temperature [A50 (50° C./h 10N] about 80° C. The high density polyethylene (HDPE) has a density in the range of 0.96 to 0.965. In one implementation, the high density polyethylene (HDPE) has a density in the range of 0.961 to 0.965. The thickness of the printable layer comprising of polypropylene elastomer can be in the range of 20 to 50 microns.

As described above, the printable layer comprising of polypropylene elastomer 202 is a blend of two different thermoplastic polymer, i.e., polypropylene elastomer and high density polyethylene (HDPE), an anti-block additive and a colorant. The soft and velvet touch barrier laminate features a soft touch and feel surface layer with the help of two different thermoplastic polymer alloying, co-extruding the polymer alloy with a stiffer thermoplastic polymeric base and a thermoplastic polymeric layer with low seal initiation temperature.

Anti-block additives are inorganic particles, such as ground silica, and help in separating otherwise sticky layers while tightly wound in a coiler (roll) form. Anti-block additives also help in forwarding the sticky web or film against smooth metal surface. Inorganic particles basically create a tiny air pocket around it and provide an air cushion to the sticky web or film to roll over the smooth metal or filmic surface. In one implementation, anti-block additive can have a particle size in the range of 10 to 30 microns. In another implementation, the anti-block additive can be selected from the group consisting of ground silica, silicas, aluminosilicates, and metal aluminosilicates. In another implementation, the anti-block additive can be ground silica, wherein the particle size of the ground silica is in a range of 10 mic to 30 mic.

The colorant may be chosen depending upon the desired color to be imparted to the laminate. The colorant can selected from the group consisting of titanium dioxide ($TiO_2$), zinc sulfide (ZnS), zinc oxide (ZnO), barium sulfate ($BaSO_4$), carbon black and calcium carbonate ($CaCO_3$). Colorants could be inorganic pigments, such as titanium dioxide, calcium carbonate, barium sulphate, carbon black etc. in pulvarised form. In one implementation the colorant can have a particle size in the range of 10 to 30 microns. Colourants can be introduced in the printable layer in a form of Master Batch. In one implementation, the colorant can be in the form of master batch with linear polyethylene carrier and having pigment concentration from 50% to 75%, wherein the pigment loading percentage is 3.% to 8% with respect to outer polyethylene layer In one implementation, the soft and velvet touch barrier laminate includes: (a) a printable layer comprising of polypropylene elastomer; (b) a core layer adjacent to the printable layer, wherein the core layer comprises of a blend of at least two polyethylene polymers and a colorant; (c) a laminating layer adjacent to the core layer; (d) a barrier layer between first and second bond layers, wherein the first bond layer is between the laminating layer and the barrier layer; and (e) a inner polyethylene (PE) layer adjacent to the second bond layer which is in contact with the barrier layer; wherein said polypropylene elastomer has Vicat softening temperature in the range of 60° C. to 90° C.

The core layer that is adjacent to the printable layer can be a blend of high density polyethylene, linear low density polyethylene, and a colorant. The blend ratio of high density polyethylene, linear low density polyethylene, and the colorant can be in the range of 50:45:5 to 80:10:10 respectively. The core layer can have a thickness in the range of 20 to 50 microns. The core layer can be a blend of metallocene linear low density polyethylene (mLLDPE) with HDPE to provide low Seal Initiation Temperature (low SIT) in order to create affinity to couple with printable layer and the laminating layer. A high ratio of HDPE in the core layer can make the film very stiff and resilient to easy squeeze as well as inert to bond with adjacent coextruded polymeric layers.

In another implementation, the soft and velvet touch barrier laminate includes: (a) a printable layer comprising of polypropylene elastomer; (b) a core layer adjacent to the printable layer, wherein the core layer comprises of a blend of at least two polyethylene polymers and a colorant with a blend ratio in the range of 90:10 to 95:5; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In another implementation, the soft and velvet touch barrier laminate includes: (a) a printable layer comprising of polypropylene elastomer; (b) a core layer adjacent to the printable layer, wherein the core layer comprises of a blend of at least two polyethylene polymers and a colorant with a blend ratio of 95:5; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer, wherein the core layer comprises of a blend of at least two polyethylene polymers and a colorant, wherein the at least two polyethylene polymers is selected from the group consisting of linear low density polyethylene (LLDPE), low density polyethylene (LDPE), metallocene linear low density polyethylene (mLLDPE), high density polyethylene (HDPE) and medium low density polyethylene (MDPE); (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer, wherein the core layer comprises of a blend of at least two polyethylene polymers and a colorant, wherein the at least two polyethylene polymers is a blend of high density polyethylene (HDPE) and metallocene linear low density polyethylene (mLLDPE) in the ratio of 3:2 to 1:1.1; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer, wherein the core layer comprises of a blend of at least two polyethylene polymers and a colorant, wherein the colorant is selected from the group consisting of titanium dioxide ($TiO_2$), zinc sulfide (ZnS), zinc oxide (ZnO), barium sulfate ($BaSO_4$), calcium carbonate ($CaCO_3$), and combinations thereof; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C. In one implementation, the colorant present in the core layer can be present in the form of master batch with linear polyethylene carrier and having pigment concentration from 50% to 75%, wherein the pigment loading percentage is 3% to 8% with respect to outer polyethylene layer.

In one implementation, the soft and velvet touch barrier laminate includes: (a) a printable layer comprising of polypropylene elastomer; (b) a core layer adjacent to the printable layer, wherein the core layer has a thickness in the range of 20 to 50 microns; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer comprises of a blend of at least two polyethylene polymers and a colorant; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In another implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer comprises of a blend of at least two polyethylene polymers and a colorant with a blend ratio in the range of 90:10 to 95:5; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In another implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer comprises of a blend of at least two polyethylene polymers and a colorant with a blend ratio of 95:5; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer comprises of a blend of at least two polyethylene polymers and a colorant, wherein the at least two polyethylene polymers is selected from the group consisting of linear low density polyethylene (LLDPE), low density polyethylene (LDPE), metallocene linear low density polyethylene (mLLDPE), high density polyethylene (HDPE) and medium low density polyethylene (MDPE); (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer comprises of a blend of at least two polyethylene polymers and a colorant, wherein the at least two polyethylene polymers is a blend of high density polyethylene (HDPE) and metallocene linear low density polyethylene (mLLDPE) in the ratio of 3:2 to 1:1.1; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer comprises of a blend of at least two polyethylene polymers and a colorant, wherein the colorant is selected from the group consisting of titanium dioxide ($TiO_2$), zinc sulfide (ZnS), zinc oxide (ZnO), barium sulfate ($BaSO_4$), calcium carbonate ($CaCO_3$), and combinations thereof; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer has a thickness in the range of 20 to 50 microns; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer, wherein the laminating layer comprises of a blend of at least two polymers selected from the group consisting of linear low density polyethylene (LLDPE), low density polyethylene (LDPE), metallocene linear low density polyethylene (mLLDPE), high density polyethylene (HDPE) and medium low density polyethylene (MDPE); (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

The laminating layer of the soft and velvet touch barrier laminate can be laminated with an article. The printable layer and the laminating layer thickness can be kept symmetrical to make the coextruded film 200 lay flat with minimal curling. Lay flat film is easy to laminate in secondary process and generates negligible stress in the formed articles. The laminating layer can be a blend of linear low density polyethylene, and high density polyethylene. The blend ratio of linear low density polyethylene, and high density polyethylene can be 50:50 to 80:20. In one implementation, the laminating layer can be a blend of linear low density polyethylene, high density polyethylene, and low density polyethylene in the ratio range of 70:20:10 to 60:20:20. Addition of LDPE improves processability in conventional co-extrusion machines.

In one implementation, the soft and velvet touch barrier laminate includes: (a) a printable layer comprising of polypropylene elastomer; (b) a core layer adjacent to the printable layer; (c) a laminating layer adjacent to the core layer, wherein the at least two polymers of laminating layer are linear low density polyethylene (LLDPE), and high density polyethylene (HDPE) with a blend ratio in the range of 50:50 to 80:20; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer, wherein the at least two polymers of laminating layer are linear low density polyethylene (LLDPE), and high density polyethylene (HDPE) with a blend ratio of 70:30; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In another implementation, the soft and velvet touch barrier laminate includes: (a) a printable layer comprising of polypropylene elastomer; (b) a core layer adjacent to the printable layer; (c) a laminating layer adjacent to the core layer, wherein the laminating layer has a thickness in the range of 20 to 50 microns; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer, wherein the laminating layer comprises of a blend of at least two polymers selected from the group consisting of linear low density polyethylene (LLDPE), low density polyethylene (LDPE), metallocene linear low density polyethylene (mLLDPE), high density polyethylene (HDPE) and medium low density polyethylene (MDPE); (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer, wherein the at least two polymers of laminating layer are linear low density polyethylene (LLDPE), and high density polyethylene (HDPE) with a blend ratio in the range of 50:50 to 80:20; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer, wherein the at least two polymers of laminating layer are linear low density polyethylene (LLDPE), and high density polyethylene (HDPE) with a blend ratio of 70:30; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In another implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer, wherein the laminating layer has a thickness in the range of 20 to 50 microns; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer, wherein the core layer has a thickness in the range of 20 to 50 microns; (c) a laminating layer adjacent to the core layer, wherein the laminating layer has a thickness in the range of 20 to 50 microns; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the bond layer is selected from the group consisting of ethylene acrylic acid (EAA), maleic anhydride grafter; and (e) an inner polyethylene (PE) layer adjacent to the second bond layer which is in contact with the barrier layer; wherein said polypropylene elastomer has Vicat softening temperature in the range of 60° C. to 90° C.

The bond layer comprises of first bond layer and second bond layer. The first bond layer acts as bond between the laminating layer of the surface film 200 and the barrier layer whereas second bond layer acts as bond between barrier layer and inner polyethylene (PE) layer. The thickness of the bond layers can be in the range of 25 micron to 50 micron.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the bond layer is selected from the group consisting of ethylene acrylic acid (EAA), maleic anhydride grafter; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the bond layer has a thickness in the range of 25 to 50 microns; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE); (b) a core layer adjacent to the printable layer; (c) a laminating layer adjacent to the core layer; (d) a barrier layer between first and second bond layers, wherein the first bond layer is between the laminating layer and the barrier layer, wherein the bond layer is selected from the group consisting of ethylene acrylic acid (EAA), maleic anhydride grafter; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE); (b) a core layer adjacent to the printable layer; (c) a laminating layer adjacent to the core layer; (d) a barrier layer between first and second bond layers, wherein the first bond layer is between the laminating layer and the barrier layer, wherein the bond layer has a thickness in the range of 25 to 50 microns; and (e) an inner polyethylene (PE) layer adjacent to the second bond layer which is in contact with the barrier layer; wherein said polypropylene elastomer has Vicat softening temperature in the range of 60° C. to 90° C.

The barrier layer comprises of a barrier material, such as metal foil or multilayer high oxygen barrier film. The metal foil can be soft annealed aluminum foil having thickness from 6 micron to 30 micron. In one implementation, the soft and velvet touch barrier laminate includes a metal foil as the barrier layer, wherein the metal foil is soft annealed foil with surface tension 72 dyne/cm that adheres excellently with the surface film 200 and the inner polyethylene (PE) layer through the bond layers comprising of ethylene acrylic acid co-polymer (EAA) with about 7% acrylic acid. The metal foil can be laminated to EAA by 'extrusion lamination'.

Multilayer high oxygen barrier film or the non-metal multilayer barrier film includes at least five layers including a core barrier layer made up of EVOH, Nylon 6, or amorphous Nylon. In one implementation, the core barrier layer is EVOH. Thickness of the core barrier layer can be in the range of 5 micron to 25 micron. On either side of the core barrier layer, maleic anhydride grafted copolymer can be co-extruded along with two or multiple polyethylene skin layers make it up to 5, 7 or 9 layers. The barrier layer fabrication can be achieved by multilayer cast or multilayer blown film process. Multilayer high oxygen barrier film with less than 5 layers will not have adequate product shelf life. The multilayer high oxygen barrier film thickness can be in the range of 60 to 150 microns. In one implementation, the soft and velvet touch barrier laminate includes multilayer high oxygen barrier film as the barrier layer affixed the surface film 200 and the inner polyethylene layer through bond layers. In one implementation, the barrier layer includes ethylene vinyl alcohol (EVOH) as the core barrier layer with thickness in the range of 10 to 25 microns. In another implementation, the barrier layer includes ethylene vinyl alcohol (EVOH) as the core barrier layer with thickness of 15 microns. The soft and velvet touch barrier laminate with EVOH as the core barrier layer can be fabricated by blown bubble process and can have 5 to 7 layers in the barrier film. In one implementation, the barrier layer can be fabricated by placing maleic anhydride (MA) grafted PE copolymer TIE on either side of the EVOH layer followed by medium density LLDPE on the side of MA grafted TIE Layer. In another implementation, the barrier layer can be fabricated by placing Nylon6 (PA6) on either side of the EVOH layer or followed by MA grafted TIE and then outer PE skin. EVOH and PA6 has affinity to bond with each other and does not require any additional bond or TIE layer The bond layers are the extrusion lamination bond layer and consist of 7 to 12 MFI low density polyethylene. In one implementation, the bond layer is a blend of 70% LDPE with 7 MFI (density 0.918 g/cc) and 30% mLLDPE with 7 to 19 MFI (density 0.91 g/cc)

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is selected from the group consisting of metal foil barrier film and non-metal multilayer barrier film; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a metal foil barrier film with a thickness of 6 micron to 30 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is aluminum foil with a thickness of 6 micron to 30 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is aluminum foil and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is selected from the group consisting of metal foil barrier film and non-metal multilayer barrier film; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a metal foil barrier film with a thickness of 6 micron to 30 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is aluminum foil with a thickness of 6 micron to 30 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is aluminum foil; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film comprising of at least five layers selected from the group consisting of ethylene vinyl alcohol (EVOH), polyethylene terephthalate polymer (PET), nylon 6 and amorphous nylon; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of at least of five layers; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of five to nine layers; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of five to nine layers, wherein the non-metal multilayer barrier film is selected from the group consisting of ethylene vinyl alcohol (EVOH), polyethylene terephthalate polymer (PET), nylon 6 and amorphous nylon; and (e) a inner polyethylene (PE) layer adjacent to the second bond layer which is in contact with the barrier layer;

wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the non-metal multilayer barrier layer has a thickness of 60 micron to 150 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of five to nine layers, wherein the non-metal multilayer barrier film is selected from the group consisting of ethylene vinyl alcohol (EVOH), polyethylene terephthalate polymer (PET), nylon 6 and amorphous nylon, wherein the non-metal multilayer barrier layer has a thickness of 60 micron to 150 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film comprising of at least five layers selected from the group consisting of ethylene vinyl alcohol (EVOH), polyethylene terephthalate polymer (PET), nylon 6 and amorphous nylon; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of at least of five layers; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of five to nine layers; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of five to nine layers, wherein the non-metal multilayer barrier film is selected from the group consisting of ethylene vinyl alcohol (EVOH), polyethylene terephthalate polymer (PET), nylon 6 and amorphous nylon; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the non-metal multilayer barrier layer has a thickness of 60 micron to 150 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is a non-metal multilayer barrier film of five to nine layers, wherein the non-metal multilayer barrier film is selected from the group consisting of ethylene vinyl alcohol (EVOH), polyethylene terephthalate polymer (PET), nylon 6 and amorphous nylon, wherein the non-metal multilayer barrier layer has a thickness of 60 micron to 150 micron; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer, wherein the barrier layer is between the co-extruded maleic anhydride grafter and the adjacent polyethylene layers; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, wherein the inner polyethylene layer comprises of at least two layers of polymers selected from the group consisting of linear low density polyethylene (LLDPE), low density polyethylene (LDPE), high density polyethylene (HDPE) and medium low density polyethylene (MDPE); wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, wherein the inner polyethylene layer comprises of at least two layers of polymers selected from the group consisting of linear low density polyethylene (LLDPE), low density polyethylene (LDPE), high density polyethylene (HDPE) and medium low density polyethylene (MDPE), wherein the inner polyethylene layer comprises of at least three layers of polymers, wherein medium low density polyethylene (MDPE) layer is flanked by linear low density polyethylene (LLDPE) layers on both sides; wherein said polypropylene elastomer has Vicat softening temperature in the range of 60° C. to 90° C.

In one implementation, the soft and velvet touch barrier laminate includes: (a) a printable layer comprising of polypropylene elastomer; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, wherein the inner polyethylene layer has a thickness in the range of 50 to 100 micron; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, wherein the inner polyethylene layer comprises of at least two layers of polymers selected from the group consisting of linear low density polyethylene (LLDPE), low density polyethylene (LDPE), high density polyethylene (HDPE) and medium low density polyethylene (MDPE); wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, wherein the inner polyethylene layer comprises of at least two layers of polymers selected from the group consisting of linear low density polyethylene (LLDPE), low density polyethylene (LDPE), high density polyethylene (HDPE) and medium low density polyethylene (MDPE), wherein the inner polyethylene layer comprises of at least three layers of polymers, wherein medium low density polyethylene (MDPE) layer is flanked by linear low density polyethylene (LLDPE) layers on both sides; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, wherein the inner polyethylene layer has a thickness in the range of 50 to 100 micron; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant, wherein the printable layer is surface printed; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer; wherein said polypropylene elastomer has Vicat softening temperature in the range of 60° C. to 90° C.

In one implementation, the soft and velvet touch barrier laminate includes: (a) a printable layer comprising of polypropylene elastomer, high density polyethylene (HDPE), an anti-block additive; and a colorant, wherein the printable layer is surface printed; (b) a core layer adjacent to the printable layer; (c) a laminating layer adjacent to the core layer; (d) a barrier layer between first and second bond layers, wherein the first bond layer is between the laminating layer and the barrier layer; and (e) an inner polyethylene (PE) layer adjacent to the second bond layer which is in contact with the barrier layer, the inner polyethylene (PE) layer is the product contact layer; wherein said polypropylene elastomer has Vicat softening temperature in the range of 60° C. to 90° C.

The linear low density polyethylene (LLDPE) layers can have density in the range of 0.92 g/cc to 0.935 g/cc. The medium density polyethylene (MDPE) layer has density in the range of 0.93 g/cc to 0.945 g/cc.

The printable layer of the soft and velvet touch barrier laminate can be surface printed.

In one implementation, the soft and velvet touch barrier laminate includes: a printable layer comprising of polypropylene elastomer with a Vicat softening temperature in the range of 60° C. to 90° C.; high density polyethylene (HDPE); an anti-block additive; and a colorant, and having a thickness of 20 to 50 microns; a core layer comprising a blend of high density polyethylene (HDPE), metallocene linear low density polyethylene (mLLDPE), and colorant, and having a thickness of 20 to 50 microns; a laminating layer comprising a blend of at least two polymers selected from the group of linear low density polyethylene (LLDPE), low density polyethylene (LDPE) and high density polyethylene (HDPE) having a thickness of 20 to 50 microns, a bond layer having a thickness of 25 to 50 microns; an aluminum foil layer having a thickness of 6 to 30 microns; a bond layer having a thickness of 25 to 50 microns; and an inner polyethylene layer comprising of at least two layers having a thickness of 50 to 100 microns.

In one implementation, the soft and velvet touch barrier laminate includes: a printable layer comprising of polypropylene elastomer with a Vicat softening temperature in the range of 60° C. to 90° C.; high density polyethylene (HDPE); an anti-block additive; and a colorant, and having a thickness of 20 to 50 microns; a core layer comprising a blend of high density polyethylene (HDPE), metallocene linear low density polyethylene (mLLDPE), and colorant, and having a thickness of 20 to 50 microns; a laminating layer comprising a blend of at least two polymers selected from the group of linear low density polyethylene (LLDPE), low density polyethylene (LDPE) and high density polyethylene (HDPE) having a thickness of 20 to 50 microns, a first bond layer having a thickness of 25 to 50 microns; at least a five layer film with a non-metal barrier layer having a thickness of 60 to 150 microns; a second bond layer having a thickness of 25 to 50 microns; and an inner polyethylene layer having a thickness of 50 to 100 microns.

In one implementation, the soft and velvet touch barrier laminate includes: a printable layer comprising of polypropylene elastomer with a Vicat softening temperature about 80° C.; high density polyethylene (HDPE); ground silica; and a colorant in a blend ratio of 20:70:2:8 to 60:25:5:10, and having a thickness of 20 to 50 microns; a core layer comprising a blend of high density polyethylene (HDPE), metallocene linear low density polyethylene (mLLDPE), and colorant in a blend ratio of 50:45:5 to 80:10:10, and having a thickness of 20 to 50 microns; a laminating layer comprising a blend of at least two polymers selected from the group of linear low density polyethylene (LLDPE), low density polyethylene (LDPE) and high density polyethylene (HDPE) having a thickness of 20 to 50 microns, a first bond layer having a thickness of 25 to 50 microns; a five to seven layer non-metal multilayer barrier film with EVOH as the core barrier layer having a thickness of 60 to 150 microns; a second bond layer having a thickness of 25 to 50 microns; and an inner polyethylene layer comprising of at least two layers of polymers selected from the group consisting of linear low density polyethylene (LLDPE), low density polyethylene (LDPE), high density polyethylene (HDPE) and medium low density polyethylene (MDPE) having a thickness of 50 to 100 microns. In one implementation, the soft and velvet touch barrier laminate includes: a printable layer comprising of polypropylene elastomer with a Vicat softening temperature about 80° C.; high density polyethylene (HDPE); ground silica with particle size of 30 microns; and black with a particle size of 30 microns in a blend ratio of 20:70:2:8 to 60:25:5:10, and having a thickness of 20 to 50 microns; a core layer comprising a blend of high density polyethylene (HDPE), metallocene linear low density polyethylene (mLLDPE), and colorant in a blend ratio of 50:45:5 to 80:10:10, and having a thickness of 20 to 50 microns; a laminating layer comprising a blend of at least two polymers selected from the group of linear low density polyethylene (LLDPE), low density polyethylene (LDPE) and high density polyethylene (HDPE) having a thickness of 20 to 50 microns, a first bond layer having a thickness of 25 to 50 microns; a five to seven layer non-metal multilayer barrier film with EVOH as the core barrier layer having a thickness of 60 to 150 microns; a second bond layer having a thickness of 25 to 50 microns; and an inner polyethylene layer comprising of at least two layers of polymers selected from the group consisting of linear low density polyethylene (LLDPE), low density polyethylene (LDPE), high density polyethylene (HDPE) and medium low density polyethylene (MDPE) having a thickness of 50 to 100 microns. In one implementation, the soft and velvet touch barrier laminate has a thickness in the range of 250 to 500 microns.

In another implementation, the soft and velvet touch barrier laminate includes a printable layer comprising of polypropylene elastomer with a Vicat softening temperature in the range of 60° C. to 90° C.; high density polyethylene (HDPE); an anti-block additive; and a colorant, and having a thickness of 20 to 50 microns; a core layer comprising a blend of high density polyethylene (HDPE), metallocene linear low density polyethylene (mLLDPE), and colorant, and having a thickness of 20 to 50 microns; a laminating layer comprising a blend of at least two polymers selected from the group of linear low density polyethylene (LLDPE), low density polyethylene (LDPE) and high density polyethylene (HDPE) having a thickness of 20 to 50 microns; a bond layer having a thickness of 25 to 50 microns; an aluminium foil layer having a thickness of 6 to 30 microns; a bond layer having a thickness of 25 to 50 microns; and an inner polyethylene layer comprising of at least two layers having a thickness of 50 to 100 microns.

In one implementation, the soft and velvet touch barrier laminate can be readily formed into articles with soft and velvet touch. Articles of the present disclosure may be fabricated in a variety of configurations which take advantage of the properties of the soft and velvet touch barrier laminate.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

Example 1

Process for Preparing Surface Film 200
Printable Layer

The printable layer comprises of polypropylene elastomer with semi crystallinity having Vicat softening temperature [A50(50° C./h 10N] about 80° C., high density polyethylene with a density of 0.965, black master batch with a particle size of 30 microns, 60% loading with respect to polyethylene carrier and 40 MFI, and ground silica with particle size of 30 microns. The aforementioned materials are vacuum sucked from their independent storage container and weighed through gravimetric feeder and poured in to the extruder (A) hopper. The weight percentage of Polypropylene elastomer, High density polyethylene, colorant and anti-block additive are 45:45:6:4.
The Core Layer The core layer includes two basic polymers namely high density polyethylene and linear low density polymer and black Master batch as defined above. All the three inputs are vacuum sucked from their independent storage container and weighed through gravimetric feeder and poured in to the extruder (B) hopper. The weight percentage of High density polyethylene, linear low density polyethylene and colorant are 46:46:8.

The Laminating Layer

The laminating layer includes two polymers blend namely Linear low density polymer and Low density polyethylene. Both the inputs are vacuum sucked from their independent storage container and weighed through gravimetric feeder and poured in to the extruder (C) hopper. The weight percentage of linear low density polymer and Low density polyethylene are 80:20.

All the Extruders are having Hoppers, Groove barrel Feed section, compression, metering and mixing section followed by Screen Pack, Adapter and multichannel DIE. Extruder (A), (B) and (C) layer ratio was maintained at 1:1:1 respectively but depending upon the laminate resilience, the range could be 1:2:1 or 1:3:1.

The polymer blends gets channelized through multilayer stack circular DIE and during the passage of the molten polymer layers through the longer die-lip the polymer layers get bonded with each other thus do not require and additional bond or Tie polymer layer. Moreover, the polymers have been selected in such a manner that all the polymers and its blends irrespective of individual extruder, has an affinity to adhere or bond with each other. Hot polymer melt, at the exit of the Die-lip, gets inflated by pressurized air to give shape and size of the desired bubble dimension and the Lay-flat width of the multilayer film. Bubble at the exit of the Circular Die-lip is very hot but gets cool through Dual lip Cold Air jets from outside the bubble. At the same time the inner bubble cooler (IBC) also cool down the bubble from inside (surface). Partially cooled bubble travel upward (of about 15 meters height) and gets cooled down further by exchanging heat with the atmospheric temperature. Entire length of the bubble kept straight with the help of segmented Teflon coated guide rollers, collapsing frame and eventually passed through a 'NIP' rollers. NIP roller consists of a Silicone Rubberized roll and Water cooled steel roll. Collapsed bubble at the exit of the NIP roll gets flattened, travel downstream towards slitter rewinder. On the way, the flattened bubble, specifically to the outer surface, gets Corona treatment to enhance the polymer surface energy to 46 dyne/cm. treated bubble then cut open at the edges, separated and coiled individually at the A and B core. Coiled film linear length and reel diameter is maintained according to the secondary process (lamination) requirement.

Process of Making Barrier Layer:

The soft and velvet touch barrier laminate with non-metal multilayer barrier film as the barrier layer can be prepared following the aforementioned bubble blown process. However, in this case, there will be min. of 5 extruders-5 layer or (preferably) 7 extruders and 7 layers bubble process.

5 layer—5 extruders bubble process: Extruders are named as A,B,C,D & E. While extruder C is dedicated to process barrier polymers such as Nylon6, Amorphous Nylon or EVOH, Extruder B and D are dedicated to process TIE polymer such as Maleic anhydride grafted PE co-polymer. Layer A & E (both are skin layers) are always kept for processing LLDPE, LDPE and suitable blend of LLDPE and LDPE to gain desired film strength, elasticity and processing efficiency. LLDPE could be selected from a new generation metallocene LLDPE with density range 0.920 to 0.942 g/cc. LDPE could be selected from a density range of 0.92 to 0.933 g/cc. Layer thickness of the polymer layers are as follows,

|  | Extruders | | | | | |
| --- | --- | --- | --- | --- | --- | --- |
|  | A | B | C | D | E | Total |
| POLYMER | LLDPE + LDPE | TIE | EVOH | TIE | LLDPE + LDPE |  |
| Thickness | 20 | 12 | 15 | 12 | 20 | 79 |

7 layer—7 extruders bubble process: Extruders named as A,B,C,D,E,F & G. While extruder C,D &E have been dedicated to process barrier polymers such as Nylon6, Amorphous Nylon or EVOH. For optimum performance, Extruder C & E extruded with EVOH, 32% ethylene content and Extruder D extruded with Nylon6. Extruder B and F dedicated to process TIE polymer such as Maleic anhydride grafted PE co-polymer. Layer A & F (both are skin layers) are always kept for processing LLDPE, LDPE and suitable blend of LLDPE and LDPE to gain desired film strength and processing efficiency. LLDPE could be a new generation metallocene LLDPE with density range 0.920 to 0.942 g/cc. LDPE could be selected from a density range of 0.92 to 0.933 g/cc. Layer thickness of the polymer layers are as follows,

|  | Extruders | | | | | | | |
| --- | --- | --- | --- | --- | --- | --- | --- | --- |
|  | A | B | C | D | E | F | G | Total |
| POLYMER | LLDPE + LDPE | TIE | EVOH | NYLON6 | EVOH | TIE | LLDPE + LDPE |  |
| Thickness | 20 | 12 | 5 | 5 | 5 | 12 | 20 | 79 |

The soft and velvet touch barrier laminate with metal foil barrier film as the barrier layer was prepared by using aluminum foil of thickness 12 microns and was extruded with ethylene acrylic co-polymer to bond the metal foil with surface film 200 and inner multilayer PE film. Metal foil based laminate structure will be as follows,

|  | Layer configuration | | | | | |
| --- | --- | --- | --- | --- | --- | --- |
|  | Print layer | Bond layer | Barrier | Bond layer | Sealant Layer | Total |
| Polymer combination | Soft feel outer layer, 200 | LLDPE + EAA, 402 | Aluminum foil | LLDPE + EAA, 404 | LLDPE + LDPE, 502 |  |
| Thickness (mic) | 130 | 30 | 12 | 30 | 70 | 272 |

Process of making the inner polythene layer: The inner polyethylene layer is made of three layers. The middle layer is made out polymer such as Medium density polyethylene, blend of HDPE and LLDPE (50:50 ratio) whereas the outer layers are a blend of linear low density polyethylene with minority blend of low density polyethylene. Bubble blown process is used to prepare the inner polyethylene layer.

Properties of Soft Feel Mat Black Color Laminate with EVOH Barrier Core with a Barrier Film of Five Layers

| Test | Measurement Standard | Instrument used | Value |
| --- | --- | --- | --- |
| 'Sore hardness-D' of the soft feel layer i.e. Print layer | ASTM D2240 | Durometer | 60 ± 5 |
| 'Ra' value of the soft feel layer i.e. Print layer | ISO 1997 | Mitutoyo SJ210 | 0.85 ± 5µ |
| Gloss value of the laminate surface (soft & Mat) layer | ASTM D523 | GLOSS METER | At 20°: 0<br>At 60°: 0<br>At 85°: 0.3 |
| Static COF (Soft feel/Print side to metal) | ASTM D 1894-78 | LLOYDS LR5K PLUS | MD: 0.2 ± 0.05<br>TD: 0.15 ± 0.05 |
| Kinetic COF (Soft feel/Print side to metal) | ASTM D 1894-78 | LLOYDS LR5K PLUS | MD: 0.10 ± 0.05<br>TD: 0.08 ± 0.05 |

Properties of Standard Black Laminate (without Soft Feel Polymer Addition on the Outer Print Layer)

A laminate was prepared following the above mentioned procedure with EVOH as the core barrier layer and the barrier film with five layers. The surface film layer was prepared without the polypropylene elastomer. The weight percentage of HDPE, LLDPE, and carbon black are in the ratio of 50:40:10. All other layers remain the same

| Test | Measurement Standard | Instrument used | Value |
| --- | --- | --- | --- |
| 'Sore hardness-D' of the soft feel layer i.e. Print layer | ASTM D2240 | Durometer | 75 ± 5 |
| 'Ra' value of the soft feel layer i.e. Print layer | ISO 1997 | Mitutoyo SJ210 | 0.34 ± 5µ |
| Gloss value of the laminate surface (soft & Mat) layer | ASTM D523 | GLOSS METER | At 20°: 0.3<br>At 60°: 0.1<br>At 85°: 0.8 |
| Static COF (Soft feel/Print side to metal) | ASTM D 1894-78 | LLOYDS LR5K PLUS | MD: 0.10 ± 0.05<br>TD: 0.12 ± 0.05 |
| Kinetic COF (Soft feel/Print side to metal) | ASTM D 1894-78 | LLOYDS LR5K PLUS | MD: 0.09 ± 0.05<br>TD: 0.08 ± 0.05 |

Example 2

Article Containing the Laminate

Jumbo soft-mat multilayer laminate slit in to container specific diameter and running length of 600 to 100 meters. For example, for container diameter 'D', the slit width(W) will be "(π*D)+5!. In case of 35 mm dia container, slit width will be, W(in mm)=(π*D)+5. Or (3.142*35)+5 or 114.97.

Where, 5 mm is the constant value used as standard for all across the container slit width calculation. Out of this 5 mm, 1.2 mm is kept for container side seam overlap and remaining 3.8 mm is maintain for side trim with 1.9 mm on each side.

Container diameter specific Slit reels are then printed with customer given graphic design by using Gravure, Flexograsphic, Letterpress, Rotary screen, foil blocking or combination of multiple printing technology said above. once the printing is completed, the printed web goes through a varnish over coat and get cured by intense UV rays at the last print station. Printed and varnish cured web then winded or coiled on the rewinder shaft. Printed and varnish cured web is kept at room temperature for 8 to 24 hours before it is taken for container formation.

Container forming processes involve web tension control unit, container formation unit, sizing unit, shoulder forming unit and capping unit. Entire process is controlled by statistical process control computer or SPCC.

Printed web is mounted on the container body forming unit and adjust the web tension in accordance to web thickness and web width. Web is threaded through the container body forming mandrel, a long Stainless steel hollow cylinder fitted with Internal and external High frequency energy coil, water circulation system to keep the unit cool and rubberized carrier belt to assist uniform web forwarding through the container seaming unit. Once the initial parameter is set and QA inspection is done, computer takes charge of the complete operation and gradually speeds up to the set production speed (between 20 pcs/min to 500 pcs/min.)

High frequency side sealing or welding process are as follows, a. 5 KW High frequency (HF) generator induces the power in to 1 set of magnetic steel band, call internal and external steel band. During web threading, both the edges are placed in between the magnetic steel band and then pressed uniformly with the help of insulated metal block which is water circulated (to keep the welding area cool) and exert hydraulic pressure to get desired weld/seam compression. In ESSEL specific process, we maintain seam compression in between 12% to 30%. Depending upon the line speed, HF generator power and hydraulic pressure get automatically adjusted with the help of high speed SPC computers. Side seam compression is calculated with the formula as follows, i. Side seam compression(in %)=(Av. web thickness ×2)−thickness of the seam(post welding)/(Av. web thickness ×2)%.

ii. For example, if the web thickness is 400 micron, and post seam welding, seam thickness is 560 micron, seam compression (%) will be ((400*2)−(560))/(400*2)% or 30% b. Post side seaming, container body robotically transferred to the container heading unit, where plasticized HDPE, density range between 0.946 g/cc to 0.965 g/cc and MFI between 1.2 to 3.5 g/10 min. (@190° C./2.16 kg), in doughnut form is thrown into a mould, locked with the container body and compressed to get composite container with body and head including threads at the orifice end. Post compression, container head gets cooling while remaining compressed in the mould and eventually transfer to the auto capping unit where desired closure is either screwed or push fit to the container head.

Post production, the containers are checked by Quality for its dimensions, color shades-including graphics and text details. Innovation team check the container in terms of it's intrinsic properties as follows,

| | | LAMINATE CODE→ | |
|---|---|---|---|
| | | EP 4015 SOFT Matt Black | EP 4015 Black |
| | | STRUCTURE → | |
| PROPERTIES | Unit | 125μ SOFT MATT BLACK FILM/20μ LD EX./100μ NPE FILM/20μ LD EX./79μ EVOH FILM/20μ LD EX./40μ NPE FILM Value | 125μ BLACK FILM/20μ LD EX./100μ NPE FILM/20μ LD EX./79μ EVOH FILM/20μ LD EX./40μ NPE FILM. Value |
| WEIGHT | g/m² | 385.46 | 394.89 |
| THICKNESS | Mic. | 404.66 | 414.28 |
| TEAR STRENGTH (LLOYDS) | | | |
| MD | Kg/80 m | 4.38 | 5.70 |
| TD | m | 6.42 | 6.35 |
| STIFFNESS | | | |
| MD | mg | 816.92 | 705.94 |
| TD | | 870.20 | 858.00 |
| TENSILE STRENGTH | | | |
| MD | Kg/cm² | 5.24 | 5.35 |
| TD | | 3.97 | 4.50 |
| ELONGATION | | | |
| MD | % | 327.50 | 324.88 |
| TD | | 197.63 | 222.53 |
| YOUNGS MODULUS | | | |
| MD | Mpa | 465.37 | 516.52 |
| TD | | 462.83 | 486.91 |
| COF | Print (Matt Surface)/ Metal | 0.227 | 0.100 |
| MD | | | |
| TD | | 0.207 | 0.096 |
| MD | Sealant/ Metal | 0.112 | 0.105 |
| TD | | 0.088 | 0.084 |

-continued

| | | LAMINATE CODE→ | |
|---|---|---|---|
| | | EP 4015 SOFT Matt Black | EP 4015 Black |
| | | STRUCTURE → | |
| PROPERTIES | Unit | 125μ SOFT MATT BLACK FILM/20μ LD EX./100μ NPE FILM/20μ LD EX./79μ EVOH FILM/20μ LD EX./40μ NPE FILM Value | 125μ BLACK FILM/20μ LD EX./100μ NPE FILM/20μ LD EX./79μ EVOH FILM/20μ LD EX./40μ NPE FILM. Value |
| TUBE RESILIENCE | | | |
| 35Ø | gms | 758 | 947 |
| 38Ø | | 650 | 787 |
| TUBE BOUNCE BACK | | | |
| 35Ø | gms | 205 | 263 |
| 38Ø | | 148 | 172 |
| OPACITY | % | 0.00 | 0.00 |
| OPTICAL PROPERTIES | | | |
| L | | 27.35 | 27.80 |
| a | | 0.05 | −0.02 |
| b | | −0.17 | −0.07 |

Although the subject matter has been described in considerable detail with reference to certain examples and implementations thereof, other implementations are possible. As such, the spirit and scope of the appended claims should not be limited to the description of the preferred examples and implementations contained therein.

I claim:

1. A soft and velvet touch barrier laminate comprising:
    (a) a printable layer comprising a polypropylene elastomer;
    (b) a core layer adjacent to the printable layer;
    (c) a laminating layer adjacent to the core layer;
    (d) a barrier layer between first and second bond layers, wherein the first bond layer is between the laminating layer and the barrier layer; and
    (e) an inner polyethylene (PE) layer adjacent to the second bond layer which is in contact with the barrier layer;
    wherein said polypropylene elastomer has Vicat softening temperature in the range of 60° C. to 90° C., wherein the printable layer further comprises high density polyethylene (HDPE); an anti-block additive; and a colorant.

2. The laminate as claimed in claim 1, wherein the printable layer comprises polypropylene elastomer, high density polyethylene (HDPE), anti-block additive and the colorant in a blend ratio in the range of 26:70:2:2 to 60:25:5:10.

3. The laminate as claimed in claim 1, wherein the anti-block additive is selected from the group consisting of ground silica, silicas, aluminosilicates, and metal aluminosilicates.

4. The laminate as claimed in claim 1, wherein the colorant is selected from the group consisting of titanium dioxide (Ti$_2$), zincsulfide (ZnS), zinc oxide (ZnO), barium sulfate (BaSO$_4$), carbon black, and Calcium Carbonate (CaCO$_3$).

5. The laminate as claimed in claim 1, wherein the printable layer has a thickness in the range of 20 to 50 microns.

6. The laminate as claimed in claim 1, wherein the core layer comprises a blend of at least two polyethylene polymers and a colorant.

7. The laminate as claimed in claim 1, wherein the core layer comprises a blend of at least two polyethylene polymers and a colorant with a blend ratio in the range of 90:10 to 95:5.

8. The laminate as claimed in claim 6, wherein the at least two polyethylene polymers is a blend of high density polyethylene (HDPE) and metallocene linear low density polyethylene (mLLDPE) in the ratio of 3:2 to 1:1.1.

9. The laminate as claimed in claim 1, wherein the core layer has a thickness in the range of 20 to 50 microns.

10. The laminate as claimed in claim 1, wherein the laminating layer comprises a blend of at least two polymers selected from the group consisting of linear low density polyethylene (LLDPE), low density polyethylene (LDPE), metallocene linear low density polyethylene (mLLDPE), high density polyethylene (HDPE) and medium low density polyethylene (MDPE).

11. The laminate as claimed in claim 10, wherein the at least two polymers of laminating layer are linear low density polyethylene (LLDPE), and high density polyethylene (HDPE) with a blend ratio in the range of 50:50 to 80:20.

12. The laminate as claimed in claim 1, wherein the laminating layer has a thickness in the range of 20 to 50 microns.

13. The laminate as claimed in claim 1, wherein the first and second bond layers are each independently selected from the group consisting of ethylene acrylic acid (EAA) and maleic anhydride grafter (MA grafter).

14. The laminate as claimed in claim 1, wherein the barrier layer is selected from the group consisting of metal foil barrier film and non-metal multilayer barrier film.

15. The laminate as claimed in claim 14, wherein the metal foil barrier layer has a thickness of 6 microns to 30 microns.

16. The laminate as claimed in claim 14, wherein the non-metal multilayer barrier film is selected from the group consisting of ethylene vinyl alcohol (EVOH), polyethylene terephthalate polymer (PET), nylon 6, and amorphous nylon.

17. The laminate as claimed in claim 14, wherein the non-metal multilayer barrier layer is at least a five layered film.

18. The laminate as claimed in claim 14, wherein the non-metal multilayer barrier layer has a thickness of 60 microns to 150 microns.

19. The laminate as claimed in claim 1, wherein the inner polyethylene layer comprises of at least two layers of polymers selected from the group consisting of linear low density polyethylene (LLDPE), low density polyethylene (LDPE), high density polyethylene (HDPE), and medium low density polyethylene (MDPE).

20. The laminate as claimed in claim 19, wherein the inner polyethylene layer comprises of at least three layers of polymers, wherein medium low density polyethylene (HDPE) layer is flanked by linear low density polyethylene (LLDPE) layers on both sides.

21. The laminate as claimed in claim 1, wherein the inner polyethylene layer has a thickness in the range of 50 to 100 microns.

22. The laminate as claimed in claim 1, wherein the first and second bond layers each have a thickness in the range of 25 to 50 microns.

23. The laminate as claimed in claim 1, wherein said laminate has a thickness in the range of 250 to 500 microns.

24. A laminate comprising:
a printable layer comprising of polypropylene elastomer with a Vicat softening temperature in the range of 60° C. to 90° C.; high density polyethylene (HDPE); an anti-block additive; and a colorant, and having a thickness of 20 to 50 microns;
a core layer comprising a blend of high density polyethylene (HDPE), metallocene linear low density polyethylene (mLLDPE), and colorant, and having a thickness of 20 to 50 microns;
a laminating layer comprising a blend of at least two polymers selected from the group of linear low density polyethylene (LLDPE), low density polyethylene (LDPE), and high density polyethylene (HDPE) having a thickness of 20 to 50 microns;
a bond layer having a thickness of 25 to 50 microns;
an aluminum foil layer having a thickness of 6 to 30 microns;
a bond layer having a thickness of 25 to 50 microns; and
an inner polyethylene layer comprising of at least two layers having a thickness of 50 to 100 microns.

25. A laminate as claimed in claim 1 comprising:
a printable layer comprising of polypropylene elastomer with a Vicat softening temperature in the range of 60° C. to 90° C.; high density polyethylene (HDPE); an anti-block additive; and a colorant, and having a thickness of 20 to 50 microns;
a core layer comprising a blend of high density polyethylene (HDPE), metallocene linear low density polyethylene (mLLDPE), and colorant, and having a thickness of 20 to 50 microns;
a laminating layer comprising a blend of at least two polymers selected from the group of linear low density polyethylene (LLDPE), low density polyethylene (LDPE) and high density polyethylene (HDPE) having a thickness of 20 to 50 microns;
a bond layer having a thickness of 25 to 50 microns;
at least a five layer film with a non-metal barrier layer having a thickness of 60 to 150 microns;
a bond layer having a thickness of 25 to 50 microns; and
an inner polyethylene layer having a thickness of 50 to 100 microns.

26. The laminate as claimed in claim 10, wherein the at least two polymers of laminating layer are linear low density polyethylene (LLDPE), and high density polyethylene (HDPE) with a blend ratio in the range of 70:30.

* * * * *

UNITED STATES PATENT AND TRADEMARK OFFICE
CERTIFICATE OF CORRECTION

PATENT NO. : 10,189,197 B2  
APPLICATION NO. : 15/325285  
DATED : January 29, 2019  
INVENTOR(S) : Mrinal Kanti Banerjee Page 1 of 1

It is certified that error appears in the above-identified patent and that said Letters Patent is hereby corrected as shown below:

In the Claims

Claim 4, Column 27, Line 1, replace "(Ti$_2$)" with "(TiO$_2$)"

Claim 20, Column 28, Line 4, replace "(HDPE)" with "(MDPE)"

Signed and Sealed this  
Fifth Day of March, 2019

Andrei Iancu  
*Director of the United States Patent and Trademark Office*